United States Patent
Chen et al.

(10) Patent No.: US 11,349,767 B2
(45) Date of Patent: *May 31, 2022

(54) DEVICE AND METHOD FOR DISABLING A WLAN HOTSPOT BASED ON DATA TRAFFIC VALUE

(71) Applicant: Honor Device Co., Ltd., Guangdong (CN)

(72) Inventors: Xiaochen Chen, Shanghai (CN); Qingquan Peng, Shanghai (CN); Peili Xu, Shenzhen (CN); Shuaisheng Guo, Warsaw (PL); Chao Jiang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,254

(22) Filed: Sep. 28, 2020

(65) Prior Publication Data

US 2021/0083984 A1    Mar. 18, 2021

Related U.S. Application Data

(63) Continuation of application No. 15/523,034, filed as application No. PCT/CN2014/090059 on Oct. 31, 2014, now Pat. No. 10,791,060.

(51) Int. Cl.
*H04L 12/859* (2013.01)
*H04L 47/2475* (2022.01)
(Continued)

(52) U.S. Cl.
CPC ...... *H04L 47/2475* (2013.01); *H04L 43/0882* (2013.01); *H04L 67/36* (2013.01);
(Continued)

(58) Field of Classification Search
CPC . H04L 47/2475; H04L 43/0882; H04L 67/36; H04L 43/16; H04W 28/10; H04W 28/0215; H04W 76/36
See application file for complete search history.

(56) References Cited

U.S. PATENT DOCUMENTS

2010/0289656 A1*  11/2010  Fujioka ............... H04L 12/4625
                                                      340/644
2012/0163232 A1    6/2012  Yoo
(Continued)

FOREIGN PATENT DOCUMENTS

CN    101340449 A    1/2009
CN    101854649 A    10/2010
(Continued)

OTHER PUBLICATIONS

Office Action issued in Chinese Application No. 201480056538.2 dated Jan. 16, 2019, 8 pages.
1. U.S. Appl. No. 15/523,034, filed Apr. 28, 2017.

*Primary Examiner* — Afshawn M Towfighi
(74) *Attorney, Agent, or Firm* — Leydig, Voit & Mayer, Ltd.

(57) ABSTRACT

This application discloses a data traffic management method and apparatus. The method includes: obtaining traffic control information of a first application and a data traffic value used by the first application, where the traffic control information includes at least an upper traffic threshold; and disconnecting a data connection of the first application when the data traffic value used by the first application is greater than or equal to the upper traffic threshold included in the traffic control information of the first application. In the foregoing solution, real-time traffic management on a single application is implemented, so that a user instantly modifies traffic control information according to a requirement, to manage data traffic in real time.

18 Claims, 6 Drawing Sheets

(51) Int. Cl.
  *H04W 28/10*  (2009.01)
  *H04L 43/0882*  (2022.01)
  *H04L 67/75*  (2022.01)
  *H04W 28/02*  (2009.01)
  *H04W 76/36*  (2018.01)
  *H04L 43/16*  (2022.01)

(52) U.S. Cl.
  CPC ....... *H04W 28/0215* (2013.01); *H04W 28/10* (2013.01); *H04L 43/16* (2013.01); *H04W 76/36* (2018.02)

(56) References Cited

U.S. PATENT DOCUMENTS

| | | | |
|---|---|---|---|
| 2013/0102276 A1* | 4/2013 | Raj | H04W 4/24 |
| | | | 455/406 |
| 2013/0196615 A1 | 8/2013 | Zalmanovitch et al. | |
| 2015/0011179 A1* | 1/2015 | Won | H04W 4/80 |
| | | | 455/405 |
| 2017/0141932 A1* | 5/2017 | Tang | H04W 76/14 |

FOREIGN PATENT DOCUMENTS

| | | |
|---|---|---|
| CN | 102006576 A | 4/2011 |
| CN | 102612084 A | 7/2012 |
| CN | 103096384 A | 5/2013 |
| CN | 103209439 A | 7/2013 |
| CN | 103945410 A | 7/2014 |
| CN | 104105124 A | 10/2014 |
| EP | 2391179 A1 | 11/2011 |
| EP | 2469754 A2 | 6/2012 |
| EP | 2779752 A1 | 9/2014 |
| JP | 2009164993 A | 7/2009 |

* cited by examiner

| Traffic management | | Traffic management | | Traffic management | | Traffic management |
|---|---|---|---|---|---|---|
| Application 1 (no limitation) | | Application 1 | Upper traffic threshold | Application 1, limited to 30M/month, with 10M used | | The application 1 has reached a limit of 30M/month, and data traffic is disabled |
| Application 2 (no limitation) | | Upper traffic limit | 30 M | Application 2 (no limitation) | | Application 2 (no limitation) |
| Application 3 (no limitation) | | Statistics period, per | month | Application 3 (no limitation) | | Application 3 (no limitation) |
| ... | | Cancel | OK | ... | | ... |

DEVICE AND METHOD FOR DISABLING A WLAN HOTSPOT BASED ON DATA TRAFFIC VALUE

CROSS REFERENCE TO RELATED APPLICATIONS

This application is a continuation of U.S. patent application Ser. No. 15/523,034, filed on Apr. 28, 2017, which is a National Stage of International Application No. PCT/CN2014/090059 filed on Oct. 31, 2014, all of which are herein incorporated by reference.

TECHNICAL FIELD

This application relates to the communications network field, and in particular, to a data traffic management method and apparatus.

BACKGROUND

With development of wireless network communications technologies, more mobile terminals have a "network sharing" function. A mobile terminal may serve as an access point (access point, AP) to share, in a Wireless Fidelity (Wireless Fidelity, WiFi) manner, data traffic of the mobile terminal with another terminal that can access a WiFi access point, so that a terminal that accesses the mobile terminal can use the data traffic of the mobile terminal. The data traffic includes mobile data traffic for accessing a base station and data traffic for accessing the WiFi access point.

When the mobile terminal shares, by using the "network sharing" function and in a WiFi manner, the mobile data traffic for accessing the base station with another terminal for use, a common data traffic management method is setting a threshold, in units of months, for mobile data traffic of the mobile terminal. When a currently used data traffic value that is counted by the mobile terminal is greater than the threshold, data connection is restricted, to prevent excessive traffic use, thereby implementing management on total data traffic of the mobile terminal.

However, in this data traffic management method, only data traffic used by all application programs of the mobile terminal is managed (for example, when data traffic used by the mobile terminal is greater than or equal to a maximum data traffic value that a data traffic package customized by a user allows to use, information is sent to prompt the user), but separate traffic management cannot be performed on data traffic used by an application (for example, an application such as WeChat, a network disk, an application market, or a cloud service) in the mobile terminal. As a result, the mobile terminal exceeds traffic in the pre-ordered package because data traffic is improperly used, which further causes an unnecessary economic loss to the user.

SUMMARY

This application provides a data traffic management method and apparatus, so as to perform real-time traffic management on a single application, so that a user instantly modifies traffic control information according to a requirement, to manage data traffic in real time; or to perform real-time traffic management on a single application according to a preset statistical period, so that a user can precisely manage and control a data traffic value according to a requirement.

To resolve the foregoing problem, a first aspect of this application provides a data traffic management method, including: obtaining traffic control information of a first application, where the traffic control information includes at least an upper traffic threshold; obtaining a data traffic value used by the first application in a preset time; and disconnecting a data connection of the first application when the data traffic value is greater than or equal to the upper traffic threshold.

With reference to the first aspect, in a first possible implementation manner of the first aspect of this application, the traffic control information includes the upper traffic threshold and a traffic monitoring period, where the upper traffic threshold is used to indicate a maximum data traffic value that the first application is allowed to use in the traffic monitoring period; and the disconnecting a data connection of the first application when the data traffic value is greater than or equal to the upper traffic threshold is specifically: disconnecting the data connection of the first application when the data traffic value is greater than or equal to the upper traffic threshold in the traffic monitoring period.

With reference to the first aspect or the first possible implementation manner of the first aspect, in a second possible implementation manner of the first aspect of this application, the method further includes: obtaining a traffic control information modification instruction that is entered by a user, where the traffic control information modification instruction is used to modify the upper traffic threshold; and the disconnecting a data connection of the first application when the data traffic value is greater than or equal to the upper traffic threshold included in the traffic control information includes: disconnecting the data connection of the first application when a modified upper traffic threshold is greater than the unmodified upper traffic threshold and the traffic data value is greater than or equal to the modified upper traffic threshold; or retaining a data connection status of the first application when a modified upper traffic threshold is greater than the unmodified upper traffic threshold and the traffic data value is less than the modified upper traffic threshold; or disconnecting the data connection of the first application when a modified upper traffic threshold is less than the unmodified upper traffic threshold and the traffic data value is greater than or equal to the modified upper traffic threshold; or retaining a data connection status of the first application when a modified upper traffic threshold is less than the unmodified upper traffic threshold and the traffic data value is less than the modified upper traffic threshold.

With reference to the first aspect and either of the first and second possible implementation manners of the first aspect, in a third possible implementation manner of the first aspect of this application, after the disconnecting a data connection of the first application, the method further includes: resetting the data traffic value used by the first application in the preset time.

With reference to the first aspect and any one of the foregoing first to third possible implementation manners of the first aspect, in a fourth possible implementation manner of the first aspect of this application, the disconnecting a data connection of the first application when the data traffic value is greater than or equal to the upper traffic threshold includes: presenting user prompt information when the data traffic value is greater than or equal to the upper traffic threshold, where the user prompt information is used to prompt the user whether to disconnect the data connection of the first application; and obtaining an instruction, triggered by the user, of disconnecting a data connection, and disconnecting the data connection of the first application according to the instruction of disconnecting a data connection.

With reference to the first aspect and any one of the foregoing first to fourth possible implementation manners of the first aspect, in a fifth possible implementation manner of the first aspect of this application, the first application is a functional application for sharing data traffic, and the obtaining a data traffic value used by the first application in a preset time includes: obtaining a data traffic value used in the preset time by all terminals that perform data connection by using the first application; and the disconnecting a data connection of the first application when the data traffic value is greater than or equal to the upper traffic threshold includes: disabling the first application when the data traffic value used by all the terminals that perform data connection by using the first application is greater than or equal to the upper traffic threshold; or disconnecting a data connection between the first application and all the terminals that perform data connection by using the first application, when the data traffic value used by all the terminals that perform data connection by using the first application is greater than or equal to the upper traffic threshold; or disconnecting a data connection between the first application and a terminal modem modem module when the data traffic value used by all the terminals that perform data connection by using the first application is greater than or equal to the upper traffic threshold.

To resolve the foregoing problem, a second aspect of this application provides a data traffic management apparatus, including: a traffic control information obtaining module, a data traffic value obtaining module, and a control module, where the traffic control information obtaining module is configured to obtain traffic control information of a first application, where the traffic control information includes at least an upper traffic threshold; the data traffic value obtaining module is configured to obtain a data traffic value used by the first application in a preset time; and the control module is configured to disconnect a data connection of the first application when the data traffic value obtained by the data traffic value obtaining module is greater than or equal to the upper traffic threshold.

With reference to the second aspect, in a first possible implementation manner of the second aspect of this application, the traffic control information includes the upper traffic threshold and a traffic monitoring period, where the upper traffic threshold is used to indicate a maximum data traffic value that the first application is allowed to use in the traffic monitoring period; and the control module is specifically configured to disconnect the data connection of the first application when in the traffic monitoring period, the data traffic value obtained by the data traffic value obtaining module is greater than or equal to the upper traffic threshold.

With reference to the second aspect or the first possible implementation manner of the second aspect, in a second possible implementation manner of the second aspect of this application, the apparatus further includes an input module, where the input module is configured to obtain a traffic control information modification instruction that is entered by a user, and the traffic control information modification instruction is used to modify the upper traffic threshold; and the control module is specifically configured to: disconnect the data connection of the first application when an upper traffic threshold modified by the input module is greater than the unmodified upper traffic threshold and the traffic data value is greater than or equal to the modified upper traffic threshold; or retain a data connection status of the first application when an upper traffic threshold modified by the input module is greater than the unmodified upper traffic threshold and the traffic data value is less than the modified upper traffic threshold; or disconnect the data connection of the first application when an upper traffic threshold modified by the input module is less than the unmodified upper traffic threshold and the traffic data value is greater than or equal to the modified upper traffic threshold; or retain a data connection status of the first application when an upper traffic threshold modified by the input module is less than the unmodified upper traffic threshold and the traffic data value is less than the modified upper traffic threshold.

With reference to the second aspect and either of the first and second possible implementation manners of the second aspect, in a third possible implementation manner of the second aspect of this application, the apparatus further includes a reset module, where the reset module is configured to: after the control module disconnects the data connection of the first application, reset the data traffic value used by the first application in the preset time.

With reference to the second aspect and any one of the first to third possible implementation manners of the second aspect, in a fourth possible implementation manner of the second aspect of this application, the control module includes an information prompt unit and an instruction execution unit, where the information prompt unit is configured to present user prompt information when the data traffic value is greater than or equal to the upper traffic threshold, where the user prompt information is used to prompt the user whether to disconnect the data connection of the first application; and the instruction execution unit is configured to: after the information prompt unit presents the user prompt information, obtain an instruction, triggered by the user, of disconnecting a data connection, and disconnect the data connection of the first application according to the instruction of disconnecting a data connection.

With reference to the second aspect and any one of the first to fourth possible implementation manners of the second aspect, in a fifth possible implementation manner of the second aspect of this application, the first application is a functional application for sharing data traffic, and the traffic control information obtaining module is specifically configured to obtain a data traffic value used in the preset time by all terminals that perform data connection by using the first application; and the control module is specifically configured to: disable the first application when the data traffic value that is used by all the terminals that perform data connection by using the first application and is obtained by the data traffic value obtaining module is greater than or equal to the upper traffic threshold; or disconnect a data connection between the first application and all the terminals that perform data connection by using the first application, when the data traffic value that is used by all the terminals that perform data connection by using the first application and is obtained by the data traffic value obtaining module is greater than or equal to the upper traffic threshold; or disconnect a data connection between the first application and a terminal modem modem module when the data traffic value that is used by all the terminals that perform data connection by using the first application and is obtained by the data traffic value obtaining module is greater than or equal to the upper traffic threshold.

To resolve the foregoing problem, a third aspect of this application provides a data traffic management apparatus, including the following steps and including a processor, where the processor is configured to: obtain traffic control information of a first application, and obtain a data traffic value used by the first application in a preset time, where the traffic control information includes at least an upper traffic threshold; and the processor is further configured to disconnect a data connection of the first application when the data traffic value is greater than or equal to the upper traffic threshold.

With reference to the third aspect, in a first possible implementation manner of the third aspect of this application, the traffic control information includes the upper traffic threshold and a traffic monitoring period, where the upper traffic threshold is used to indicate a maximum data traffic value that the first application is allowed to use in the traffic monitoring period; and the processor is specifically configured to disconnect the data connection of the first application when the data traffic value is greater than or equal to the upper traffic threshold in the traffic monitoring period.

With reference to the third aspect or the first possible implementation manner of the third aspect, in a second possible implementation manner of the third aspect of this application, the apparatus further includes an input device, where the input device is configured to obtain a traffic control information modification instruction that is entered by a user, and the traffic control information modification instruction is used to modify the upper traffic threshold; and the processor is specifically configured to: disconnect the data connection of the first application when an upper traffic threshold modified by the input module is greater than the unmodified upper traffic threshold and the traffic data value is greater than or equal to the modified upper traffic threshold; or retain a data connection status of the first application when an upper traffic threshold modified by the input module is greater than the unmodified upper traffic threshold and the traffic data value is less than the modified upper traffic threshold; or disconnect the data connection of the first application when an upper traffic threshold modified by the input module is less than the unmodified upper traffic threshold and the traffic data value is greater than or equal to the modified upper traffic threshold; or retain a data connection status of the first application when an upper traffic threshold modified by the input module is less than the unmodified upper traffic threshold and the traffic data value is less than the modified upper traffic threshold.

With reference to the third aspect and either of the first and second possible implementation manners of the third aspect, in a third possible implementation manner of the third aspect of this application, the processor is further configured to: after disconnecting the data connection of the first application, reset the data traffic value used by the first application in the preset time.

With reference to the third aspect and any one of the first to third possible implementation manners of the third aspect, in a fourth possible implementation manner of the third aspect of this application, the apparatus further includes an output device, where the output device is configured to present user prompt information when the data traffic value obtained by the processor is greater than or equal to the upper traffic threshold, and the user prompt information is used to prompt the user whether to disconnect the data connection of the first application; and the processor is further configured to: after the output device presents the user prompt information, obtain an instruction, triggered by the user, of disconnecting a data connection, and disconnect the data connection of the first application according to the instruction of disconnecting a data connection.

With reference to the third aspect and any one of the first to fourth possible implementation manners of the third aspect, in a fifth possible implementation manner of the third aspect of this application, the first application is a functional application for sharing data traffic, and the processor is specifically configured to obtain a data traffic value used in the preset time by all terminals that perform data connection by using the first application; and the processor is specifically configured to: disable the first application when the data traffic value used by all the terminals that perform data connection by using the first application is greater than or equal to the upper traffic threshold; or disconnect a data connection between the first application and all the terminals that perform data connection by using the first application, when the data traffic value used by all the terminals that perform data connection by using the first application is greater than or equal to the upper traffic threshold; or disconnect a data connection between the first application and a terminal modem modem module when the data traffic value used by all the terminals that perform data connection by using the first application is greater than or equal to the upper traffic threshold.

In the foregoing solution, traffic control information of a first application and a data traffic value used by the first application are obtained, and a data connection of the first application is disconnected when the data traffic value used by the first application is greater than or equal to an upper traffic threshold included in the traffic control information of the first application. In this solution, real-time traffic management can be performed on a single application, so that a user can precisely manage and control data traffic according to a requirement, thereby improving user experience.

BRIEF DESCRIPTION OF DRAWINGS

FIG. 3 is a schematic diagram of an implementation manner of a data traffic management user interface according to this application;

DESCRIPTION OF EMBODIMENTS

In the following description, to illustrate rather than limit, specific details such as a particular system structure, an interface, and a technology are provided to make a thorough understanding of this application.

Figure 1:
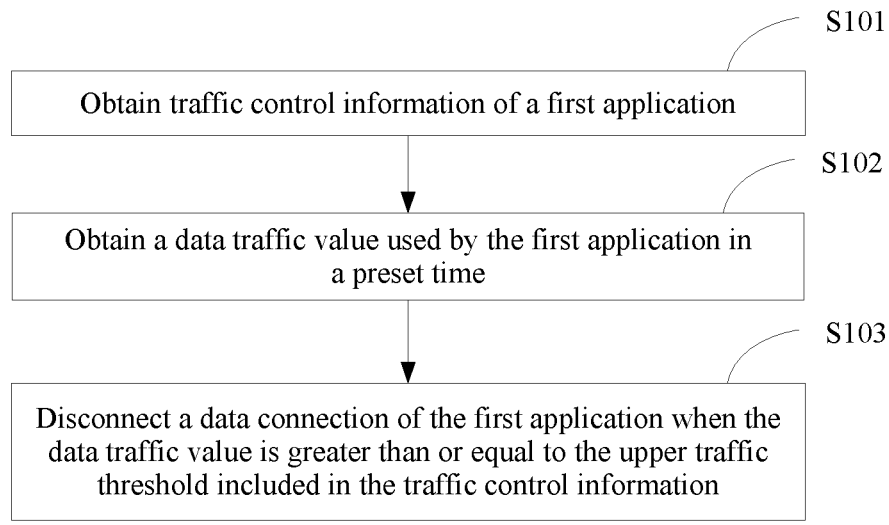
FIG. 1 is a flowchart of an implementation manner of a data traffic management method according to this application.

Referring to FIG. 1, FIG. 1 is a flowchart of an implementation manner of a data traffic management method according to this application. This implementation manner is described from a perspective of a terminal, and may be executed by a terminal that obtains data traffic from a base station, or may be a MiFi terminal that obtains data traffic from a data traffic card. The terminal can share data traffic by using a network sharing function, for example, by enabling a hotspot. This implementation manner specifically includes the following steps.

S101. Obtain traffic control information of a first application, where the traffic control information includes at least an upper traffic threshold.

Optionally, a user may enable a traffic management function of the first application by using a traffic management user interface or a shortcut key, to perform traffic management on the first application. The upper traffic threshold may be an upper traffic threshold that is set by the user for the first application, or may be an upper traffic threshold that is preset by a terminal for the first application, for example, a traffic threshold evenly distributed by the terminal according to multiple applications, which is not limited.

The first application may be any application that causes the terminal to perform data interaction or data connection with a base station or a data traffic card, or to generate data traffic.

Optionally, the first application may be any one of applications installed in the terminal, for example, an application program, such as WeChat, a network disk, an application market, or a cloud service, that is installed in a system of the terminal and can perform data interaction with a server.

Optionally, the first application may be a functional application for sharing data traffic by the terminal, and the functional application for sharing data traffic may be an application that can share data traffic of a terminal, a apparatus, or a module with at least one of other terminals in a preset manner, for example, network sharing such as WiFi network sharing, Bluetooth network sharing, or USB network sharing. WiFi network sharing indicates that a terminal performs WiFi communication with another terminal, to share data traffic of the terminal with the another terminal for use. Bluetooth network sharing indicates that a terminal performs Bluetooth communication with another terminal, to share data traffic of the terminal with the another terminal for use. USB network sharing indicates that a terminal is connected to another terminal by using a USB for USB communication, to share data traffic of the terminal with the another terminal for use.

The traffic control information may be preset by a system, or may be manually entered by the user by using a traffic management user interface. The traffic control information may be obtained by the terminal at an interval of a preset time. The preset time may be set according to an actual requirement of the user.

In this implementation manner, the data traffic is mobile data traffic, and is data traffic generated by the terminal by accessing a core network by using the base station or the data traffic card. In another implementation manner, the data traffic is wireless local area network (WirelessLocalAreaNetworks, WLAN) data traffic.

S102. Obtain a data traffic value used by the first application in a preset time.

Optionally, the preset time may be a time period that is preset by the user or the terminal and is in units of months or days.

Optionally, the data traffic value may be a data traffic value used by the first application after the traffic management is enabled, that is, a data traffic value that is used in a time period from enabling of the traffic management function of the terminal to a current time, that is, the preset time is the time period from enabling of the traffic management function to the current time.

Optionally, when the first application is the functional application for sharing data traffic, the data traffic value used by the first application includes a data traffic value used by all terminals that perform data connection by using the terminal.

S103. Disconnect a data connection of the first application when the data traffic value is greater than or equal to the upper traffic threshold included in the traffic control information.

The terminal compares the data traffic value used by the first application in the preset time with the upper traffic threshold of the first application, and performs determining. When determining that the data traffic value used by the first application in the preset time is greater than or equal to the upper traffic threshold of the first application, the terminal disconnects the data connection of the first application.

In this embodiment of the present invention, the disconnecting a data connection should be understood in a broad sense. Optionally, the disconnecting a data connection may be closing the first application. Optionally, the disconnecting a data connection may be interrupting or stopping communication between the first application and a terminal modem modem module, and in this case, another application except the first application may still communicate with the terminal modem modem module to obtain data traffic. Optionally, when the first application is the functional application for sharing data traffic, the disconnecting a data connection may be disconnecting a data connection between the first application and all the terminals that perform data connection by using the first application, that is, the first application is still in a started state but cannot connect to another terminal to perform data traffic transmission. Specifically, another manner that covers this idea may further be included.

Optionally, when the terminal determines that the data traffic value used by the first application in the preset time is less than the upper traffic threshold of the first application, the terminal further determines whether the traffic control information corresponding to the first application is modified. When determining that the traffic control information corresponding to the first application is modified in the preset time, the terminal determines whether the data traffic value used by the first application is greater than or equal to a modified upper traffic threshold, and disconnects the data connection of the first application when the data traffic value used by the first application is greater than or equal to the modified upper traffic threshold.

Optionally, when determining that two adjacent pieces of traffic control information of the first application are not modified in the preset time, the terminal compares the data traffic value currently used by the first application with the upper traffic threshold included in the traffic control information corresponding to the first application, and determines whether the data traffic value currently used by the first application is greater than the upper traffic threshold corresponding to the first application; or when determining that two adjacent pieces of traffic control information of the first application are modified in the preset time, and that the data traffic value currently used by the first application is less than the upper traffic threshold included in unmodified the traffic control information that is corresponding to the first application, the terminal compares the data traffic value currently used by the first application with an upper traffic threshold included in modified traffic control information corresponding to the first application, and determines whether the data traffic value currently used by the first application is greater than the modified upper traffic threshold corresponding to the first application. When the terminal determines that the data traffic value currently used by the first application is greater than or equal to the upper traffic threshold included in the traffic control information corresponding to the first application, the terminal disconnects the data connection of the first application and reminds the user, and the current traffic management is ended.

Optionally, after the data connection of the first application is disconnected, the data traffic value used by the first application is automatically reset, and the current traffic management on the first application is ended.

Optionally, when a manner of disconnecting a data connection of the first application is directly closing the first application, the data traffic value used by the first application is automatically reset after the first application is closed. When detecting a command of starting the first application again by the user, the terminal activates the data connection of the first application, and in this case, an initial data traffic value used by the first application is zero.

When a manner of disconnecting a data connection of the first application is interrupting or stopping communication between the first application and the terminal modem modem module, the data traffic value used by the first application is automatically reset after the data connection of the first application is disconnected. When detecting an instruction of activating the data connection of the first application, the terminal activates the data connection of the first application, and in this case, the initial data traffic value used by the first application is zero. The instruction of activating the data connection of the first application may be automatically triggered by the terminal after the preset time is reached, or may be automatically triggered by the terminal when the terminal obtains that the traffic control information of the first application is modified, and the upper traffic threshold included in the modified traffic control information is greater than the unmodified upper traffic threshold included in the traffic control information. Otherwise, no response is made to the modified traffic control information. A manner of triggering the instruction of activating the data connection of the first application is not limited thereto, and may be another manner, which is not limited herein.

It may be understood that when the current traffic management on the first application is ended, the data traffic control information of the first application may be automatically cleared by the terminal, or may be manually cleared by the user by using the traffic management user interface according to a requirement.

In this solution, real-time traffic management can be performed on a single application, so that a user can precisely manage and control data traffic according to a requirement, thereby improving user experience.

Figure 2:
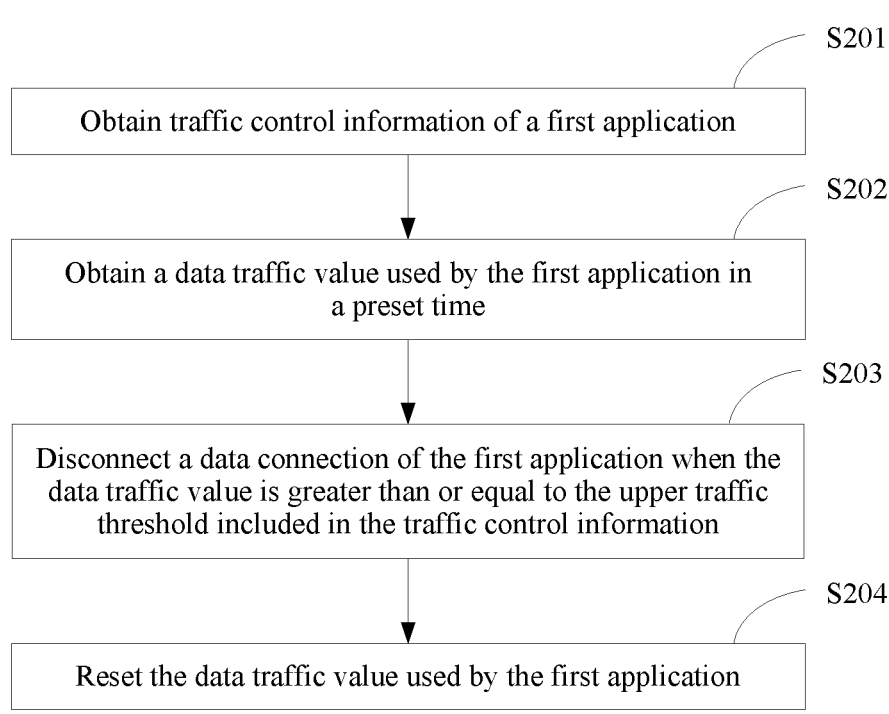
FIG. 2 is a flowchart of another implementation manner of a data traffic management method according to this application.

Referring to FIG. 2, FIG. 2 is a flowchart of another implementation manner of a data traffic management method according to this application. This implementation manner is described from a perspective of a terminal, where the terminal may be a terminal that obtains data traffic from a base station, or may be a MiFi terminal that obtains data traffic from a data traffic card, where the terminal can share data traffic by using a network sharing function. A first application is any one of applications installed in the terminal, for example, an application program, such as WeChat, a network disk, an application market, or a cloud service, that is installed in a system of the terminal and can perform data interaction with a server. A difference between this implementation manner and the previous implementation manner lies in steps S203 and S204. Steps S201 and S202 are the same as steps S101 and S102 in the previous implementation manner. For details, refer to related descriptions in steps S101 and S102 in the previous implementation manner, which are not described herein. Referring to FIG. 3, FIG. 3 is a schematic diagram of an implementation manner of a traffic management user interface according to this application.

When a user performs traffic management on an application by using a traffic management user interface, the user sets, by using a traffic management user interface shown in FIG. 3a, whether to enable traffic management on an application program in the terminal, and sets traffic control information by using a traffic management user interface similar to that shown in FIG. 3b.

After the user enables traffic management on the first application by using the traffic management user interface or start the first application of the terminal, the terminal executes steps S201 and S202.

When the traffic control information includes an upper traffic threshold and a traffic monitoring period, the upper traffic threshold is used to indicate a maximum data traffic value that the first application is allowed to use in the traffic monitoring period. The traffic monitoring period is a data traffic monitoring period of the first application, and may be specifically set by the user, for example, to one day or one month, or may be preset by the terminal, or may be calculated starting from a moment when the traffic management is enabled.

For example, when the traffic monitoring period is one month, and the upper traffic threshold is 30M, it indicates that a maximum data traffic value that the first application is allowed to use in one month is 30M.

S203. Disconnect a data connection of the first application when in the traffic monitoring period, the data traffic value is greater than or equal to the upper traffic threshold included in the traffic control information.

In the traffic monitoring period corresponding to the first application, the terminal compares the data traffic value currently used by the first application with the upper traffic threshold included in the traffic control information of the first application, and determines whether the data traffic value currently used by the first application is greater than the upper traffic threshold of the first application. For example, the terminal may display, in real time by using a user interface similar to that shown in FIG. 3c, the data traffic value currently used by the first application to the user, so that the user views the data traffic value. The user interface shown in FIG. 3c may be refreshed at a time interval, and a refreshed user interface displays in real time a latest obtained data traffic value currently used by the first application, where the time interval may be set according to a time demand of the user.

The terminal further obtains a traffic control information modification instruction that is entered by the user, where the traffic control information modification instruction is used to modify the upper traffic threshold. When the data traffic value used by the first application is greater than or equal to the upper traffic threshold included in the traffic control information, the data connection of the first application is disconnected.

Optionally, the data connection of the first application is disconnected when a modified upper traffic threshold is greater than the unmodified upper traffic threshold and the traffic data value used by the first application is greater than or equal to the modified upper traffic threshold. For example, the data connection of the first application is disconnected when the unmodified upper traffic threshold is 10M, the modified upper traffic threshold is 15M, and the traffic data value used by the first application is 16M.

Optionally, a data connection status of the first application is retained when a modified upper traffic threshold is greater than the unmodified upper traffic threshold and the traffic data value used by the first application is less than the modified upper traffic threshold. For example, the data connection of the first application is retained when the unmodified upper traffic threshold is 10M, the modified upper traffic threshold is 15M, and the traffic data value used by the first application is 6M.

Optionally, the data connection of the first application is disconnected when a modified upper traffic threshold is less than the unmodified upper traffic threshold and the traffic data value used by the first application is greater than or equal to the modified upper traffic threshold. For example, the data connection of the first application is disconnected when the unmodified upper traffic threshold is 10M, the modified upper traffic threshold is 8M, and the traffic data value used by the first application is 8M.

Optionally, a data connection status of the first application is retained when a modified upper traffic threshold is less than the unmodified upper traffic threshold and the traffic data value is less than the modified upper traffic threshold. For example, the data connection of the first application is retained when the unmodified upper traffic threshold is 10M, the modified upper traffic threshold is 8M, and the traffic data value used by the first application is 6M.

Further, the traffic control information modification instruction that is entered by the user is obtained in the traffic monitoring period corresponding to the first application, so as to obtain the modified upper traffic threshold. The traffic control information modification instruction is used to modify the upper traffic threshold.

In the traffic monitoring period corresponding to the first application, when determining that the data traffic value used by the first application is less than the upper traffic threshold included in the traffic control information of the first application, and that the traffic control information modification instruction that is entered by the user is not obtained, the terminal retains the data connection status of the first application, and continues to determine whether a newly obtained data traffic value currently used by the first application is greater than the upper traffic threshold included in the traffic control information of the first application. The terminal does not disconnects the data connection of the first application until the terminal determines that the data traffic value used by the first application is greater than or equal to the upper traffic threshold of the first application.

In the traffic monitoring period corresponding to the first application, when obtaining the traffic control information modification instruction that is entered by the user, the user obtains the modified upper traffic threshold, and determines whether the modified upper traffic threshold is greater than the unmodified upper traffic threshold and whether the data traffic value used by the first application is greater than the modified upper traffic threshold. When the terminal determines that in the traffic monitoring period corresponding to the first application, the data traffic value currently used by the first application is greater than or equal to the modified upper traffic threshold, the terminal disconnects the data connection of the first application. When determining that the modified upper traffic threshold is greater than the unmodified upper traffic threshold, and that in the traffic monitoring period corresponding to the first application, the data traffic value currently used by the first application is less than the modified upper traffic threshold, the terminal retains the data connection status of the first application, and continues to determine whether a newly obtained data traffic value currently used by the first application is greater than the modified upper traffic threshold; or when determining that the modified upper traffic threshold is greater than the unmodified upper traffic threshold, and that in the traffic monitoring period corresponding to the first application, the data traffic value currently used by the first application is greater than or equal to the modified upper traffic threshold, the terminal disconnects the data connection of the first application; or when determining that the modified upper traffic threshold is less than the unmodified upper traffic threshold, and that in the traffic monitoring period corresponding to the first application, the data traffic value currently used by the first application is less than the modified upper traffic threshold corresponding to the first application, the terminal retains the data connection status of the first application, and continues to determine whether a newly obtained data traffic value currently used by the first application is greater than the modified upper traffic threshold. The terminal does not disconnect the data connection of the first application until the terminal determines that the data traffic value used by the first application is greater than or equal to the modified upper traffic threshold.

It may be understood that, in this process, if in the traffic monitoring period corresponding to the first application, the terminal obtains again a traffic control information modification instruction that is entered by the user, the terminal repeatedly executes, in the foregoing manner, a step of obtaining the upper traffic threshold, and determining whether the data traffic value currently used by the first application is greater than or equal to the modified upper traffic threshold. The terminal does not disconnect the data connection of the first application until the terminal determines that the data traffic value currently used by the first application is greater than or equal to the modified upper traffic threshold.

Optionally, the traffic control information modification instruction that is entered by the user may further be used to modify the traffic monitoring period. In this case, the terminal respond to a user operation only when determining that a traffic monitoring period modified by the user is greater than the unmodified traffic monitoring period; otherwise, no response is made. An action that is performed by the terminal in response to the user operation is similar to the foregoing method. For details, refer to the foregoing related descriptions, which are not described herein.

In this implementation manner, when determining that the data traffic value currently used by the first application is greater than or equal to the upper traffic threshold corresponding to the first application, the terminal automatically disconnects the data connection of the first application, and prompts the user at the same time. For example, when the first application is an application 1, and a data traffic value currently used by the application 1 is greater than an upper traffic threshold (10M) corresponding to the application 1, data traffic of the application 1 is disabled, so as to disconnect a data connection of the application 1, and the terminal displays a user interface shown in FIG. 3d to remind the user that the data traffic value currently used by the first application is greater than or equal to a preset upper traffic threshold.

In another implementation manner, when the data traffic value is greater than or equal to the upper traffic threshold, user prompt information is presented, an instruction, triggered by the user, of disconnecting a data connection is obtained, and the data connection of the first application is disconnected according to the instruction of disconnecting a data connection. The user prompt information is used to prompt the user whether to disconnect the data connection of the first application.

Specifically, when the terminal determines that the data traffic value currently used by the first application is greater than or equal to the upper traffic threshold of the first application, the terminal presents the user prompt information, so that the user chooses whether to disconnect the data connection of the first application. When the user chooses to disconnect the data connection of the first application, the instruction, triggered by the user, of disconnecting a data connection is obtained, and the data connection of the first application is disconnected according to the instruction of disconnecting a data connection.

A manner of disconnecting a data connection may be directly closing the first application, or may be interrupting or stopping communication between the first application and a terminal modem modem module, or disabling the first application, but is not limited thereto, and in another implementation manner, may be another manner.

It may be understood that, the first application may be automatically closed by the terminal when the data connection is disconnected, or may be manually closed by the user before the data connection is disconnected.

S204. Reset the data traffic value used by the first application.

After disconnecting the data connection of the first application, the terminal determines whether the current traffic monitoring period ends. When the terminal determines that the traffic monitoring period ends, the data traffic value used by the first application is automatically reset, and the current traffic management is ended.

Optionally, in another implementation manner, when the terminal obtains the traffic control information modification instruction that is entered by the user, and the modified traffic monitoring period is greater than the unmodified traffic monitoring period, after the data connection of the first application is disconnected, and when the terminal determines that the modified traffic monitoring period does not end, the terminal further determines whether the modified traffic monitoring period is remodified.

When the terminal determines that the modified traffic monitoring period is not remodified, and when the traffic monitoring period ends, the data traffic value used by the first application is automatically reset, and the current traffic management is ended.

When the terminal determines that the modified traffic monitoring period is remodified, the terminal determines whether a remodified traffic monitoring period is greater than the unmodified traffic monitoring period. When the terminal determines that the remodified traffic monitoring period is greater than the unmodified traffic monitoring period, and when the remodified traffic monitoring period ends, the data traffic value used by the first application is automatically reset, and the current traffic management is ended. Otherwise, no response is made to the remodified traffic monitoring period, and when the unmodified traffic monitoring period ends, the data traffic value used by the first application is automatically reset, and the current traffic management is ended.

In this implementation manner, after the terminal detects that the first application is closed, the data traffic value used by the first application is automatically reset, and the current traffic management on the application is ended.

It may be understood that when the traffic management on the first application is disconnected, and the current traffic management on the first application is ended, the data traffic control information of the first application may be automatically cleared by the terminal, or may be manually cleared by the user by using the traffic management user interface according to a requirement.

After the current traffic management on the first application is ended, the user may activate the data connection of the first application by using the traffic management user interface shown in FIG. 3a, and perform new traffic data management on the first application. In this case, an initial traffic value used by the first application is zero. In the foregoing solution, traffic control information of a first application and a data traffic value used by the first application are obtained, and a data connection of the first application is disconnected when the data traffic value used by the first application is greater than or equal to an upper traffic threshold included in the traffic control information of the first application. In this solution, real-time traffic management can be performed on a single application, so that a user can instantly modify the traffic control information according to a requirement, to manage data traffic in real time.

In this solution, real-time traffic management can be performed on a single application, so that a user can precisely manage and control data traffic according to a requirement, thereby improving user experience.

Figure 4:
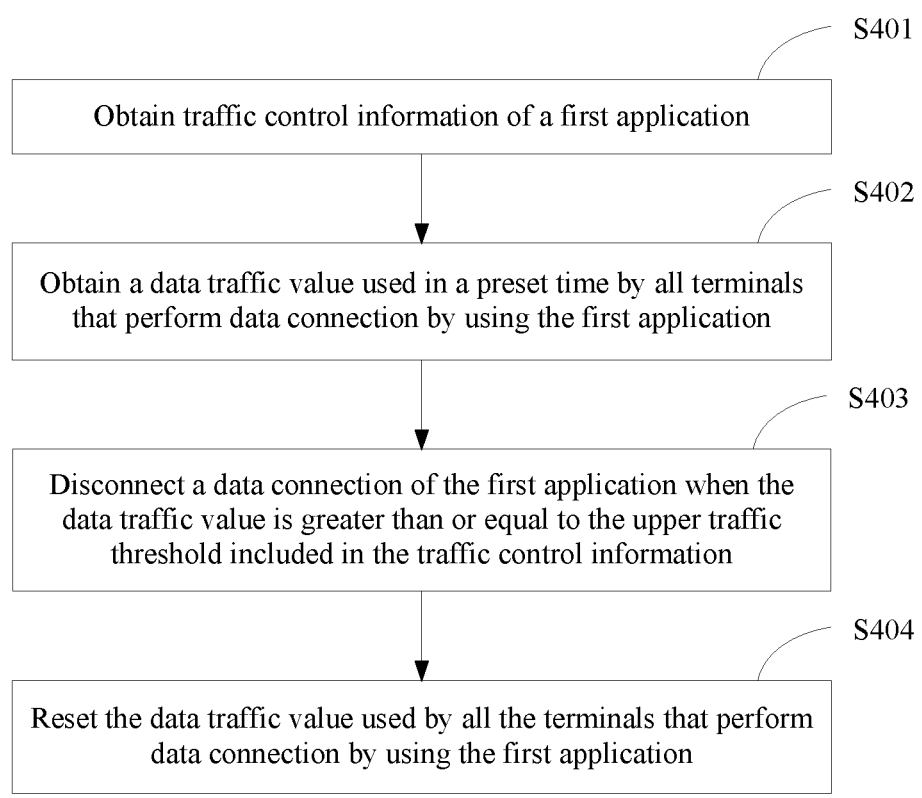
FIG. 4 is a flowchart of still another implementation manner of a data traffic management method according to this application.

Referring to FIG. 4, FIG. 4 is a flowchart of still another implementation manner of a data traffic management method according to this application. This implementation manner is described from a perspective of a terminal, where the terminal may be a terminal that obtains data traffic from a base station, or may be a MiFi terminal that obtains data traffic from a data traffic card, where the terminal can share data traffic by using a network sharing function. In this embodiment, the first application is a functional application for sharing data traffic by the terminal, for example, network sharing such as WiFi network sharing, Bluetooth network sharing, or USB network sharing. The WiFi network sharing indicates that a terminal performs WiFi communication with another terminal, to share data traffic of the terminal with the another terminal for use. The Bluetooth network sharing indicates that a terminal performs Bluetooth communication with another terminal, to share data traffic of the terminal with the another terminal for use. The USB network sharing indicates that a terminal is connected to another terminal by using a USB for USB communication, to share data traffic of the terminal with the another terminal for use. Data traffic management in this implementation manner includes the following steps.

S401. Obtain traffic control information of a first application, where the traffic control information includes at least an upper traffic threshold.

Figure 5:
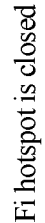
FIG. 5 is a schematic diagram of another implementation manner of a data traffic management user interface according to this application.

Referring to FIG. 5, FIG. 5 is a schematic diagram of an implementation manner of a traffic management user interface according to this application.

When a user performs traffic management on an application by a traffic management user interface, where WiFi network sharing is used as an example for description (which is not limited thereto) in this implementation manner, the user sets, by using a traffic management user interface shown in FIG. 5a, whether to start network sharing and whether to perform the traffic management on the network sharing, and sets traffic control information by using a traffic management user interface similar to that shown in FIG. 5b. After the user enables traffic management on the first application by using the traffic management user interface or starts the first application of the terminal, the terminal obtains the traffic control information of the first application. The traffic control information includes at least the upper traffic threshold of the first application.

Optionally, the traffic control information includes the upper traffic threshold and a traffic monitoring period, where the upper traffic threshold is used to indicate a maximum data traffic value that the first application is allowed to use in the traffic monitoring period. The traffic monitoring period is a data traffic monitoring period of the first application, and may be specifically set by the user, for example, to one day or one month, or may be preset by the terminal, or may be calculated starting from a moment when the traffic management is enabled. For example, when the traffic monitoring period is one month, and the upper traffic threshold is 30M, it indicates that a maximum data traffic value that the first application is allowed to use in one month is 30M. S402. Obtain a data traffic value used in a preset time by all terminals that perform data connection by using the first application.

S402. The terminal obtains a data traffic value used in a preset time by all terminals that perform data connection by using the first application.

The preset time may be in units of months or days, or may be a time period from enabling of traffic management by the user to a current time. For example, when the terminal serves as a WiFi hotspot to share, by using a WiFi network, data traffic of the terminal with another terminal for use, the terminal obtains a data traffic value used in the preset time by all terminals that perform data connection by using the WiFi hotspot.

Optionally, the data traffic value may be a data traffic value used by all the terminals after the traffic management is enabled, where all the terminals perform data connection by using the first application (the WiFi hotspot), that is, a data traffic value used by all the terminals in the time period from enabling of the traffic management function of the terminal to the current time, where all the terminals perform data connection by using the first application.

It may be understood that, when the traffic control information includes the upper traffic threshold and the traffic monitoring period, the traffic monitoring period is equivalent to a case in which the preset time is in units of months or days.

S403. Disconnect a data connection of the first application when the data traffic value is greater than or equal to the upper traffic threshold.

The terminal compares the data traffic value in the preset time with the upper traffic threshold, and determines whether the data traffic value is greater than the upper traffic threshold. The data traffic value is the data traffic value used by all the terminals that perform data connection by using the first application, and the upper traffic threshold is the upper traffic threshold included in the traffic control information of the first application.

The terminal may display, in real time by using a user interface similar to that shown in FIG. 5c, the data traffic value used by all the terminals to the user, so that the user views the data traffic value, where all the terminals perform data connection by using the first application. The user interface shown in FIG. 5c may be refreshed at a time interval, and a refreshed user interface displays in real time a latest obtained total data traffic value used by all the terminals that perform data connection by using the first application, where the time interval may be set according to a time demand of the user.

When determining that the data traffic value used in the preset time by all the terminals that perform data connection by using the first application is less than the upper traffic threshold of the first application, the terminal retains a data connection status of the first application, and continues to determine whether a newly obtained data traffic value is greater than the upper traffic threshold. The data traffic value is the data traffic value used by all the terminals that perform data connection by using the first application, and the upper traffic threshold is the upper traffic threshold included in the traffic control information of the first application.

In the preset time, when determining that the data traffic value used by all the terminals that perform data connection by using the first application is greater than or equal to the upper traffic threshold, the terminal disables or closes the first application; or when determining that the data traffic value used by all the terminals that perform data connection by using the first application is greater than or equal to the upper traffic threshold, the terminal disconnects a data connection between the first application and all the terminals that perform data connection by using the first application; or when determining that the data traffic value used by all the terminals that perform data connection by using the first application is greater than or equal to the upper traffic threshold, the terminal disconnects a data connection between the first application and a terminal modem modem module, and in this case, another application except the first application may still communicate with the terminal modem modem module to obtain data traffic.

Optionally, when determining that the data traffic value used in the preset time by all the terminals that perform data connection by using the first application is less than the upper traffic threshold of the first application, the terminal further determines whether the traffic control information corresponding to the first application is modified.

When determining that the data traffic value used in the preset time by all the terminals that perform data connection by using the first application is less than the upper traffic threshold of the first application, and that the traffic control information corresponding to the first application is modified, the terminal determines whether the data traffic value used by all the terminals that perform data connection by using the first application is greater than a modified upper traffic threshold.

When determining that the data traffic value used in the preset time by all the terminals that perform data connection by using the first application is less than the upper traffic threshold of the first application, and that the traffic control information corresponding to the first application is not modified, the terminal retains the data connection status of the first application, and continues to determine whether the data traffic value used by all the terminals that perform data connection by using the first application is greater than the upper traffic threshold of the first application. The terminal does not disconnect the data connection of the first application until the terminal determines that the data traffic value used by all the terminals that perform data connection by using the first application is greater than or equal to the upper traffic threshold of the first application.

Specifically, when the terminal determines that the data traffic value used in the preset time by all the terminals that perform data connection by using the first application is less than the upper traffic threshold of the first application:

when determining that two adjacent pieces of traffic control information of the first application are not modified, the terminal compares the data traffic value used by all the terminals that perform data connection by using the first application with the upper traffic threshold of the first application, and determines whether the data traffic value used by all the terminals that perform data connection by using the first application is greater than the upper traffic threshold corresponding to the first application; or when obtaining that the two adjacent pieces of traffic control information of the first application are modified, and that the data traffic value used by all the terminals that perform data connection by using the first application is less than the unmodified upper traffic threshold corresponding to the first application, the terminal compares the data traffic value used by all the terminals that perform data connection by using the first application with a modified upper traffic threshold of the first application, and determines whether the data traffic value currently used by the first application is greater than the modified upper traffic threshold corresponding to the first application.

When the terminal determines that the data traffic value used by all the terminals that perform data connection by using the first application is greater than or equal to the modified upper traffic threshold of the first application, the terminal disconnects the data connection of the first application and reminds the user.

In this implementation manner, when determining that the data traffic value used in the preset time by all the terminals that perform data connection by using the first application is greater than or equal to the upper traffic threshold corresponding to the first application, the terminal automatically disconnects the data connection of the first application, and prompts the user at the same time. For example, when the terminal serves as a WiFi hotspot, and a total data traffic value used by all terminals that perform data connection by using the WiFi hotspot (the first application) is equal to or greater than an upper traffic threshold (100M) corresponding to the WiFi hotspot (the first application), the WiFi hotspot is closed, and the terminal displays a user interface shown in FIG. 5d to remind the user.

In another implementation manner, when the data traffic value is greater than or equal to the upper traffic threshold, user prompt information is presented, an instruction, triggered by the user, of disconnecting a data connection is obtained, and the data connection of the first application is disconnected according to the instruction of disconnecting a data connection. The user prompt information is used to prompt the user whether to disconnect the data connection of the first application.

Specifically, when the terminal determines that the data traffic value used by all the terminals that perform data connection by using the first application is greater than or equal to the upper traffic threshold of the first application, the terminal presents the user prompt information, so that the user chooses whether to disconnect the data connection of the first application. When the user chooses to disconnect the data connection of the first application, the instruction, triggered by the user, of disconnecting a data connection is obtained, and the data connection of the first application is disconnected according to the instruction of disconnecting a data connection.

A manner of disconnecting a data connection may be directly closing the first application, or may be interrupting or stopping communication between the first application and a terminal modem modem module, or disabling the first application, but is not limited thereto, and in another implementation manner, may be another manner.

It may be understood that the first application may be automatically closed by the terminal, or may be manually closed by the user before the data connection is disconnected.

S404. Reset the data traffic value used by all the terminals that perform data connection by using the first application.

After the data connection of the first application is disconnected, the data traffic value used by all the terminals that perform data connection by using the first application is automatically reset, and the current traffic management on the first application is ended.

When a manner of disconnecting a data connection of the first application is directly closing the first application, after the first application is closed, a data traffic value used by the first application is automatically reset, and the current traffic management is ended. When detecting a command of starting the first application again by the user, the terminal activates the data connection of the first application, and in this case, an initial data traffic value used by the first application is zero.

When a manner of disconnecting a data connection of the first application is interrupting or stopping communication between the first application and the terminal modem modem module, after the data connection of the first application is disconnected, the data traffic value used by the first application is automatically reset, and the current traffic management is ended. When detecting an instruction of activating the data connection of the first application, the terminal activates the data connection of the first application, and in this case, the initial data traffic value used by the first application is zero. The instruction of activating the data connection of the first application may be automatically triggered by the terminal after the preset time arrives (the preset time is in units of months or days), or may be automatically triggered by the terminal when the terminal obtains that the traffic control information of the first application is modified, and an upper traffic threshold included in a modified traffic control information is greater than the upper traffic threshold included in the unmodified traffic control information. Otherwise, no response is made to the modified traffic control information. A manner of triggering the instruction of activating the data connection of the first application is not limited thereto, and may be another manner, which is not limited herein.

It may be understood that when the traffic management on the first application is disconnected, and the current traffic management on the first application is ended, the data traffic control information of the first application may be automatically cleared by the terminal, or may be manually cleared by the user by using the traffic management user interface according to a requirement. In the foregoing solution, traffic control information of a first application and a data traffic value used by all terminals that perform data connection by using the first application are obtained, and a data connection of the first application is disconnected when the data traffic value used by all the terminals that perform data connection by using the first application is greater than or equal to an upper traffic threshold included in the traffic control information of the first application. In this solution, real-time traffic management can be performed on a single application, so that a user can instantly modify the traffic control information according to a requirement, to manage data traffic in real time.

In this solution, real-time traffic management can be performed on a single application, so that a user can precisely manage and control data traffic according to a requirement, thereby improving user experience.

Figure 6:
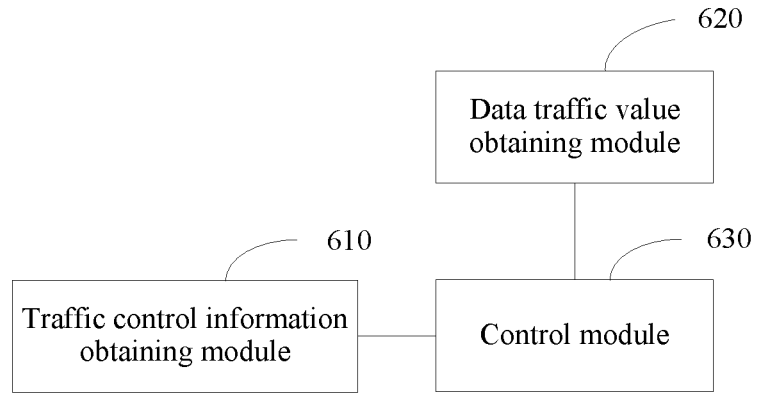
FIG. 6 is a schematic structural diagram of an implementation manner of a data traffic management apparatus according to this application.

Referring to FIG. 6, FIG. 6 is a schematic structural diagram of an implementation manner of a data traffic management apparatus according to this application. This implementation manner is described from a perspective of a terminal, where the terminal may be a terminal that obtains data traffic from a base station, or may be a MiFi terminal that obtains data traffic from a data traffic card, where the terminal can share data traffic by using a network sharing function. The data traffic management apparatus in this implementation manner is configured to execute method steps in an embodiment shown in FIG. 1, and a task executed by each module is corresponding to a corresponding method step in the embodiment shown in FIG. 1. The data traffic management apparatus in this implementation manner includes a traffic control information obtaining module 610, a traffic data value obtaining module 620, and a control module 630.

The traffic control information obtaining module 610 is configured to obtain traffic control information of a first application, where the traffic control information includes at least an upper traffic threshold.

Optionally, a user may enable a traffic management function of the first application by using a traffic management user interface, to perform traffic management on the first application.

The traffic control information obtaining module 610 obtains the traffic control information of the first application, where the traffic control information includes at least the upper traffic threshold of the first application, and the upper traffic threshold may be an upper traffic threshold that is set by the user for the first application, or may be an upper traffic threshold that is preset by the terminal for the first application, for example, a traffic threshold evenly distributed by the terminal according to multiple applications, which is not limited.

The traffic control information obtaining module 610 sends the traffic control information of the first application to the control module 630.

The data traffic value obtaining module 620 obtains a data traffic value used by the first application in a preset time. The preset time may be in units of months or days, or may be a time period from enabling of traffic management by the user to a current time.

Optionally, the data traffic value may be a data traffic value used by the first application after the traffic management is enabled, that is, a data traffic value used in the time period from enabling of the traffic management function of the terminal to the current time.

The data traffic value obtaining module 620 sends the data traffic value used by the first application in the preset time to the control module 630.

The control module 630 is configured to disconnect a data connection of the first application when the data traffic value obtained by the data traffic value obtaining module 630 is greater than or equal to the upper traffic threshold.

For example, after receiving the traffic control information of the first application sent by the traffic control information obtaining module 610, and receiving the data traffic value that is used by the first application in the preset time and is sent by the data traffic value obtaining module 630, the control module 620 compares the data traffic value used by the first application in the preset time with the upper traffic threshold included in the traffic control information of the first application, and determines whether the data traffic value currently used by the first application is greater than or equal to the upper traffic threshold of the first application.

When determining that the data traffic value used by the first application in the preset time is greater than or equal to the upper traffic threshold of the first application, the control module 630 disconnects the data connection of the first application. A manner of disconnecting a data connection may be directly closing the first application, or may be interrupting or stopping communication between the first application and a terminal modem modem module, and another application except the first application may still communicate with the terminal modem modem module to obtain data traffic, but the manner is not limited thereto, and in another implementation manner, may be another manner.

When determining that the data traffic value used by the first application in the preset time is less than the upper traffic threshold of the first application, the control module 630 continues to determine whether a newly obtained data traffic value used by the first application is greater than or equal to the upper traffic threshold of the first application.

Optionally, when determining that the data traffic value used by the first application in the preset time is greater than or equal to the upper traffic threshold of the first application, the control module 630 further determines whether the traffic control information corresponding to the first application is modified. When determining that the traffic control information corresponding to the first application is modified in the preset time, the control module 630 determines whether the data traffic value used by the first application is greater than or equal to a modified upper traffic threshold. When determining that the data traffic value used by the first application is greater than or equal to the upper traffic threshold corresponding to the first application, the control module 630 disconnects the data connection of the first application.

It may be understood that when traffic management on the first application is disconnected, and the current traffic management on the first application is ended, the data traffic control information of the first application may be automatically cleared by the control module 630, or may be manually cleared by the user by using the traffic management user interface according to a requirement.

In the foregoing solution, traffic control information of a first application and a data traffic value used by the first application are obtained, and a data connection of the first application is disconnected when the data traffic value used by the first application is greater than or equal to an upper traffic threshold included in the traffic control information of the first application. In this solution, real-time traffic management can be performed on a single application, so that a user can precisely manage and control data traffic according to a requirement, thereby improving user experience.

Figure 7:
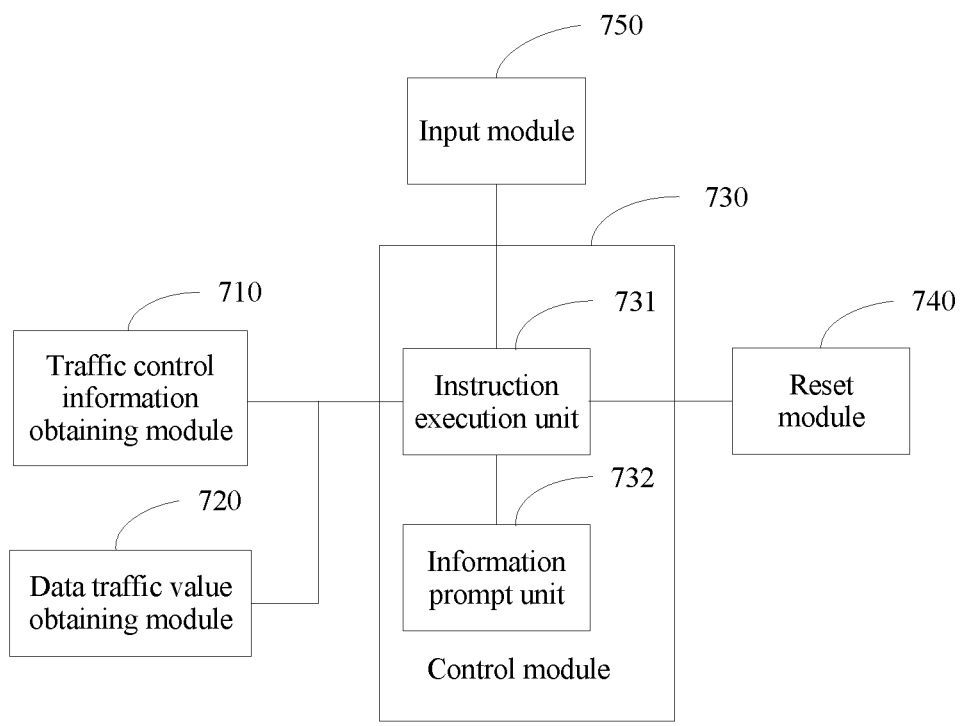
FIG. 7 is a schematic structural diagram of another implementation manner of a data traffic management apparatus according to this application.

Referring to FIG. 7, FIG. 7 is a schematic structural diagram of another implementation manner of a data traffic management apparatus according to this application. This implementation manner is described from a perspective of a terminal, where the terminal may be a terminal that obtains data traffic from a base station, or may be a MiFi terminal that obtains data traffic from a data traffic card, where the terminal can share data traffic by using a network sharing function. The data traffic management apparatus in this implementation manner is configured to execute the method steps in the embodiment shown in FIG. 2 and FIG. 3, and a task executed by each module is corresponding to a corresponding method step in the embodiment shown in FIG. 2 and FIG. 3.

The data traffic management apparatus in this implementation manner includes a traffic control information obtaining module 710, a data traffic value obtaining module 720, a control module 730, a reset module 740, and an input module 750, where the control module 730 includes an instruction execution unit 731 and an information prompt unit 732.

The traffic control information obtaining module 710 is configured to obtain traffic control information of a first application. The traffic control information includes an upper traffic threshold and a traffic monitoring period, where the upper traffic threshold is used to indicate a maximum data traffic value that the first application is allowed to use in the traffic monitoring period.

For example, the traffic control information obtaining module 710 obtains the traffic control information of the first application. The traffic control information includes the upper traffic threshold. Optionally, the traffic control information includes the upper traffic threshold and the traffic monitoring period, where the upper traffic threshold is used to indicate the maximum data traffic value that the first application is allowed to use in the traffic monitoring period.

The traffic control information obtaining module 710 sends the traffic control information of the first application to the instruction execution unit 731.

The data traffic value obtaining module 720 is configured to obtain a data traffic value used by the first application in a preset time.

For example, the data traffic value obtaining module 720 obtains the data traffic value used by the first application in the preset time.

When the first application is an application program that is installed in a system of a terminal and can perform data interaction with a server, the data traffic value obtaining module 720 obtains the data traffic value used by the first application in the preset time. When the first application is a functional application for sharing data traffic by a terminal, the data traffic value obtaining module 720 obtains a data traffic value used by all terminals that perform data connection by using the first application.

The data traffic value obtaining module 720 sends the data traffic value used by the first application in the preset time to the instruction execution unit 731.

The instruction execution unit 731 is configured to: receive the traffic control information, obtained by the traffic control information obtaining module 710, of the first application, receive the data traffic value sent by the data traffic value obtaining module, and disconnect a data connection of the first application when the data traffic value is greater than or equal to the upper traffic threshold.

When the first application is an application program that is installed in the system of the terminal and can perform data interaction with a server, the instruction execution unit 731 is specifically configured to: receive the traffic control information of the first application and the data traffic value used by the first application, and disconnect the data connection of the first application when in the traffic monitoring period, the data traffic value used by the first application is greater than or equal to the upper traffic threshold corresponding to the first application.

The instruction execution unit 731 compares the data traffic value used by the first application with the upper traffic threshold of the first application, and performs determining. When determining that the data traffic value used by the first application in the preset time is greater than or equal to the upper traffic threshold of the first application, the instruction execution unit 731 disconnects the data connection of the first application.

When determining that the data traffic value used by the first application is less than the upper traffic threshold of the first application, the instruction execution unit 731 continues to compare a re-obtained data traffic value used by the first application with a re-obtained upper traffic threshold of the first application.

When determining that the data traffic value used by the first application is greater than or equal to the upper traffic threshold corresponding to the first application, the instruction execution unit 731 disconnects the data connection of the first application.

When the first application is a functional application for sharing data traffic by a terminal, the instruction execution unit 731 is specifically configured to: receive the traffic control information of the first application and the data traffic value used by all the terminals that perform data connection by using the first application, and disconnect the data connection of the first application when the data traffic value used in the preset time by all the terminals that perform data connection by using the first application is greater than or equal to the upper traffic threshold of the first application.

When the data traffic value that is used by all the terminals that perform data connection by using the first application and is obtained by the data traffic value obtaining module 720 is greater than or equal to the upper traffic threshold, the instruction execution unit 731 disables the first application; or when the data traffic value that is used by all the terminals that perform data connection by using the first application and is obtained by the data traffic value obtaining module 720 is greater than or equal to the upper traffic threshold, the instruction execution unit 731 disconnects a data connection between the first application and all the terminals that perform data connection by using the first application; or when the data traffic value that is used by all the terminals that perform data connection by using the first application and is obtained by the data traffic value obtaining module 720 is greater than or equal to the upper traffic threshold, the instruction execution unit 731 disconnects a data connection between the first application and a terminal modem modem module.

Optionally, when the instruction execution unit 731 determines that the data traffic value of the first application is greater than or equal to a first upper traffic threshold, the information prompt unit 732 presents user prompt information, where the user prompt information is used to prompt a user whether to disconnect the data connection of the first application.

The input module 750 is configured to obtain a traffic control information modification instruction that is entered by the user, where the traffic control information modification instruction is used to modify the upper traffic threshold.

For example, after the information prompt module 732 presents the user prompt information, the input module 750 obtains the traffic control information modification instruction that is entered by the user. The input module 750 sends, to the instruction execution unit 731, the traffic control information modification instruction that is entered by the user.

The instruction execution unit 731 is configured to: after the information prompt unit 732 presents the user prompt information, obtain an instruction, triggered by the user, of disconnecting a data connection, and disconnect the data connection of the first application according to the instruction of disconnecting a data connection. For example, after the information prompt unit 732 presents the user prompt information, the instruction execution unit 731 receives the traffic control information modification instruction that is entered by the user and is sent by the input module 750, obtains the instruction, triggered by the user, of disconnecting a data connection, and disconnects the data connection of the first application according to the instruction of disconnecting a data connection.

For example, when obtaining that an upper traffic threshold modified by the input module 750 is greater than the unmodified upper traffic threshold, and that the traffic data value is greater than or equal to the modified upper traffic threshold, the instruction execution unit 731 disconnects the data connection of the first application; or when obtaining that an upper traffic threshold modified by the input module 750 is greater than the unmodified upper traffic threshold, and that the traffic data value is less than the modified upper traffic threshold, the instruction execution unit 731 retains a data connection status of the first application; or when obtaining that an upper traffic threshold modified by the input module 750 is less than the unmodified upper traffic threshold, and that the traffic data value is greater than or equal to the modified upper traffic threshold, the instruction execution unit 731 disconnects the data connection of the first application; or when obtaining that an upper traffic threshold modified by the input module 750 is less than the unmodified upper traffic threshold, and that the traffic data value is less than the modified upper traffic threshold, the instruction execution unit 731 retains a data connection status of the first application.

In this embodiment of the present invention, the disconnecting a data connection should be understood in a broad sense. Optionally, the disconnecting a data connection may be closing the first application. Optionally, the disconnecting a data connection may be interrupting or stopping communication between the first application and a terminal modem modem module, and in this case, another application except the first application may still communicate with the terminal modem modem module to obtain data traffic. Optionally, when the first application is the functional application for sharing data traffic, the disconnecting a data connection may be disconnecting a data connection between the first application and all the terminals that perform data connection by using the first application, that is, the first application is still in a started state but cannot connect to another terminal to perform data traffic transmission. Specifically, another manner that covers this idea may further be included.

After the instruction execution unit 731 disconnects the data connection of the first application, the instruction execution unit 731 sends notification information to the reset module 740.

The reset module 740 is configured to: after the instruction execution unit 731 disconnects the data connection of the first application, reset the data traffic value used by the first application in the preset time. For example, when the first application is an application program that is installed in a system of a terminal and can perform data interaction with a server:

after the instruction execution unit 731 disconnects the data connection of the first application, the reset module 740 receives the notification information, and the reset module 740 determines whether the current traffic monitoring period ends. When the reset module 740 determines that the traffic monitoring period ends, the data traffic value used by the first application is automatically reset, or the data traffic value used by all the terminals that perform data connection by using the first application is automatically reset, and the current traffic management is ended.

Optionally, in another implementation manner, when the instruction execution unit 731 obtains the traffic control information modification instruction that is entered by the user, and the reset module 740 determines that a modified traffic monitoring period is greater than the unmodified traffic monitoring period, after the instruction execution unit 731 disconnects the data connection of the first application, and when the reset module 740 determines that the modified traffic monitoring period does not end, the reset module 740 further determines whether the modified traffic monitoring period is remodified.

When the reset module 740 determines that the modified traffic monitoring period is not remodified, and when the traffic monitoring period ends, the data traffic value used by the first application is automatically reset, and the current traffic management is ended.

When the reset module 740 determines that the modified traffic monitoring period is remodified, the reset module 740 determines whether a remodified traffic monitoring period is greater than the unmodified traffic monitoring period. When the reset module 740 determines that the remodified traffic monitoring period is greater than the unmodified traffic monitoring period, and when the remodified traffic monitoring period ends, the data traffic value used by the first application is automatically reset, and the current traffic management is ended. Otherwise, no response is made to the remodified traffic monitoring period, and when the unmodified traffic monitoring period ends, the data traffic value used by the first application is automatically reset, and the current traffic management is ended.

It may be understood that when the traffic management on the first application is disconnected, and the current traffic management on the first application is ended, the data traffic control information of the first application may be automatically cleared by the terminal, or may be manually cleared by the user by using a traffic management user interface according to a requirement.

In the foregoing solution, traffic control information of a first application and a data traffic value used by the first application are obtained, and a data connection of the first application is disconnected when the data traffic value used by the first application is greater than or equal to an upper traffic threshold included in the traffic control information of the first application. In this solution, real-time traffic management can be performed on a single application, so that a user can instantly modify the traffic control information according to a requirement, to manage data traffic in real time.

In this solution, real-time traffic management can be performed on a single application, so that a user can precisely manage and control data traffic according to a requirement, thereby improving user experience.

Figure 8:
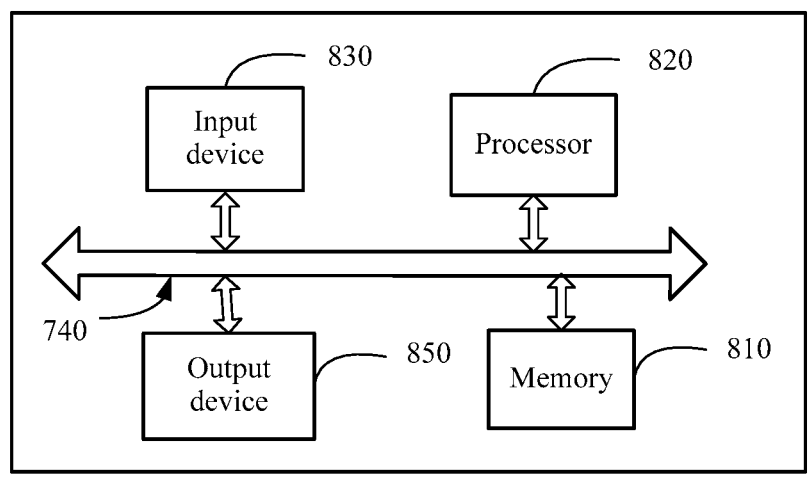
FIG. 8 is a schematic structural diagram of still another implementation manner of a data traffic management apparatus according to this application.

Referring to FIG. 8, FIG. 8 is a schematic structural diagram of still another implementation manner of a data traffic management apparatus according to this application. The data traffic management apparatus may be a terminal that obtains data traffic from a base station, or may be a MiFi terminal that obtains data traffic from a data traffic card, where the terminal can share data traffic by using a "network sharing" function. The data traffic management apparatus includes: a memory 810, a processor 820, an input device 830, a bus 840, and an output device 850. The processor 820 is connected to the memory 810 by using the 840 bus. The processor 820 is connected to the input device 830 and the output device 850 by using the bus 840.

The memory 810 stores a program instruction.

The processor 820 is a central processing unit (central processing unit, CPU for short), or a combination of a CPU and a hardware chip. The processor 820 performs the following operations according to the program instruction stored in the memory 810:

The processor 820 obtains traffic control information of a first application, and obtains a data traffic value used by the first application in a preset time, where the traffic control information includes at least an upper traffic threshold.

The processor disconnects a data connection of the first application when the data traffic value is greater than or equal to the upper traffic threshold.

Optionally, the traffic control information includes the upper traffic threshold and a traffic monitoring period, where the upper traffic threshold is used to indicate a maximum data traffic value that the first application is allowed to use in the traffic monitoring period. The processor 820 disconnects the data connection of the first application when the data traffic value is greater than or equal to the upper traffic threshold in the traffic monitoring period.

Optionally, the processor 820 further controls the input device 830 to obtain a traffic control information modification instruction that is entered by a user, where the traffic control information modification instruction is used to modify the upper traffic threshold. The processor 820 disconnects the data connection of the first application when an upper traffic threshold modified by the input module is greater than the unmodified upper traffic threshold and the traffic data value is greater than or equal to the modified upper traffic threshold; or retains a data connection status of the first application when an upper traffic threshold modified by the input module is greater than the unmodified upper traffic threshold and the traffic data value is less than the modified upper traffic threshold; or disconnects the data connection of the first application when an upper traffic threshold modified by the input module is less than the unmodified upper traffic threshold and the traffic data value is greater than or equal to the modified upper traffic threshold; or retains a data connection status of the first application when an upper traffic threshold modified by the input module is less than the unmodified upper traffic threshold and the traffic data value is less than the modified upper traffic threshold.

Optionally, after disconnecting the data connection of the first application, the processor 820 resets the data traffic value used by the first application in the preset time.

Optionally, when the data traffic value obtained by the processor 820 is greater than or equal to the upper traffic threshold, the processor 820 further controls the output device 850 to present user prompt information, where the user prompt information is used to prompt the user whether to disconnect the data connection of the first application.

After the output device 850 presents the user prompt information, the processor 820 obtains an instruction, triggered by the user, of disconnecting a data connection, and disconnects the data connection of the first application according to the instruction of disconnecting a data connection.

Optionally, the first application is a functional application for sharing data traffic; the processor 820 obtains a data traffic value used in the preset time by all terminals that perform data connection by using the first application.

The processor 820 disables the first application when the data traffic value used by all the terminals that perform data connection by using the first application is greater than or equal to the upper traffic threshold; or disconnects a data connection between the first application and all the terminals that perform data connection by using the first application, when the data traffic value used by all the terminals that perform data connection by using the first application is greater than or equal to the upper traffic threshold; or disconnects a data connection between the first application and a terminal modem modem module when the data traffic value used by all the terminals that perform data connection by using the first application is greater than or equal to the upper traffic threshold.

In the foregoing solution, traffic control information of a first application and a data traffic value used by the first application are obtained, and a data connection of the first application is disconnected when the data traffic value used by the first application is greater than or equal to an upper traffic threshold included in the traffic control information of the first application. In this solution, real-time traffic management can be performed on a single application, so that a user can precisely manage and control data traffic according to a requirement, thereby improving user experience.

In the foregoing description, for illustration but not limitation, specific details such as a particular system structure, an interface, and a technology are provided to make a thorough understanding of this application. However, a person skilled in the art should know that this application may be practiced in other implementation manners without these specific details. In other cases, detailed descriptions of well-known apparatuses, circuits, and methods are omitted, so that this application is described without being obscured by unnecessary details.

The invention claimed is:

1. A data traffic management method, comprising:
obtaining, by an electronic device, traffic control information of a wireless local area network (WLAN) hotspot of the electronic device, wherein the traffic control information comprises an upper traffic threshold;
enabling, by the electronic device, the WLAN hotspot for sharing data traffic of the electronic device with other electronic devices, wherein the data traffic comprises mobile network data traffic;
obtaining, by the electronic device, a first data traffic value, wherein the first data traffic value corresponds to a total data traffic amount used by the other electronic devices that perform data connection by using the WLAN hotspot;
disabling, by the electronic device, the WLAN hotspot based on the data traffic value being greater than or equal to the upper traffic threshold;
displaying, by the electronic device, an indicator indicating that the WLAN hotspot has been disabled;
detecting, by the electronic device, an instruction for restarting the WLAN hotspot; and
calculating, by the electronic device, a second data traffic value after the WLAN hotspot has been restarted.

2. The method according to claim 1, further comprising:
presenting user prompt information based on the first data traffic value being greater than or equal to the upper traffic threshold.

3. The method according to claim 1, further comprising:
displaying the first data traffic value in real time.

4. The method according to according to claim 3, wherein displaying the first data traffic value in real time comprises:
displaying the first data traffic value in real time on a traffic management user interface, wherein the traffic management user interface comprises the first data traffic value in real time, a WLAN hotspot switch option, a WLAN hotspot configuration option, and a single time traffic limitation option.

5. The method according to claim 1, further comprising:
resetting the first data traffic value after disabling the WLAN hotspot.

6. The method according to claim 1, wherein another application other than the WLAN hotspot continues to communicate with a modem module of the electronic device to obtain data traffic after disabling the WLAN hotspot.

7. The method according to claim 6, wherein disabling the WLAN hotspot comprises:
disconnecting a data connection between the WLAN hotspot and the modem module.

8. The method according to claim 1, further comprising:
obtaining a traffic control information modification instruction for modifying the upper traffic threshold.

9. The method according to claim 8, wherein the disabling the WLAN hotspot comprises:
disabling the WLAN hotspot based on the first data traffic value being greater than or equal to the modified upper traffic threshold.

10. The method according to according to claim 1, further comprising:
displaying a first traffic management user interface for setting the traffic control information, wherein the first traffic management user interface comprises a custom option and a 100M option.

11. An electronic device, comprising:
at least one processor; and
a memory coupled to the at least one processor and configured to store programming instructions;
wherein the at least one processor is configured to execute the programming instructions to facilitate the electronic device performing the following:
obtaining traffic control information of a wireless local area network (WLAN) hotspot of the electronic device, wherein the traffic control information comprises an upper traffic threshold;
enabling the WLAN hotspot for sharing data traffic of the electronic device with other electronic devices, wherein the data traffic comprises mobile network data traffic;
obtaining a first data traffic value, wherein the first data traffic value corresponds to a total data traffic amount used by the other electronic devices that perform data connection by using the WLAN hotspot;
disabling the WLAN hotspot based on the data traffic value being greater than or equal to the upper traffic threshold;
displaying an indicator indicating that the WLAN hotspot has been disabled;
detecting an instruction for restarting the WLAN hotspot; and
calculating a second data traffic value after the WLAN hotspot has been restarted.

12. The electronic device according to claim 11, wherein the at least one processor is further configured to execute the programming instructions to facilitate the electronic device performing the following:
presenting user prompt information based on the first data traffic value being greater than or equal to the upper traffic threshold.

13. The electronic device according to claim 11, wherein the at least one processor is further configured to execute the programming instructions to facilitate the electronic device performing the following:
displaying the first data traffic value in real time.

14. The electronic device according to claim 11, wherein the at least one processor is further configured to execute the programming instructions to facilitate the electronic device performing the following:
resetting the first data traffic value after disabling the WLAN hotspot.

15. The electronic device according to claim 11, wherein at least one processor is further configured to execute the programming instructions to facilitate another application other than the WLAN hotspot continuing to communicate with a modem module of the electronic device to obtain data traffic after disabling the WLAN hotspot.

16. The electronic device according to claim 15, wherein disabling the WLAN hotspot comprises:
disconnecting a data connection between the WLAN hotspot and the modem module.

17. The electronic device according to according to claim 11, wherein the at least one processor is further configured to execute the programming instructions to facilitate the electronic device performing the following:
displaying a first traffic management user interface for setting the traffic control information, wherein the first traffic management user interface comprises a custom option and a 100M option.

18. A non-transitory computer readable medium having processor-executable instructions stored thereon for data traffic management, wherein the processor-executable instructions, when executed, facilitate:
obtaining traffic control information of a wireless local area network (WLAN) hotspot of an electronic device, wherein the traffic control information comprises an upper traffic threshold;
enabling the WLAN hotspot for sharing data traffic of the electronic device with other electronic devices, wherein the data traffic comprises mobile network data traffic;
obtaining a first data traffic value, wherein the first data traffic value corresponds to a total data traffic amount used by the other electronic devices that perform data connection by using the WLAN hotspot;
disabling the WLAN hotspot based on the data traffic value being greater than or equal to the upper traffic threshold;
displaying an indicator indicating that the WLAN hotspot has been disabled;
detecting an instruction for restarting the WLAN hotspot; and
calculating a second data traffic value after the WLAN hotspot has been restarted.

* * * * *

UNITED STATES PATENT AND TRADEMARK OFFICE
CERTIFICATE OF CORRECTION

PATENT NO. : 11,349,767 B2
APPLICATION NO. : 17/035254
DATED : May 31, 2022
INVENTOR(S) : Chen et al.

It is certified that error appears in the above-identified patent and that said Letters Patent is hereby corrected as shown below:

On the Title Page

Item [71], "Honor Device Co., Ltd., Guangdong (CN)" should read -- Honor Device Co., Ltd., Shenzhen (CN) --.

Signed and Sealed this
Fifth Day of July, 2022

Katherine Kelly Vidal
*Director of the United States Patent and Trademark Office*